No. 849,544. PATENTED APR. 9, 1907.
G. M. HOKE.
ICE PLOW.
APPLICATION FILED APR. 2, 1906.
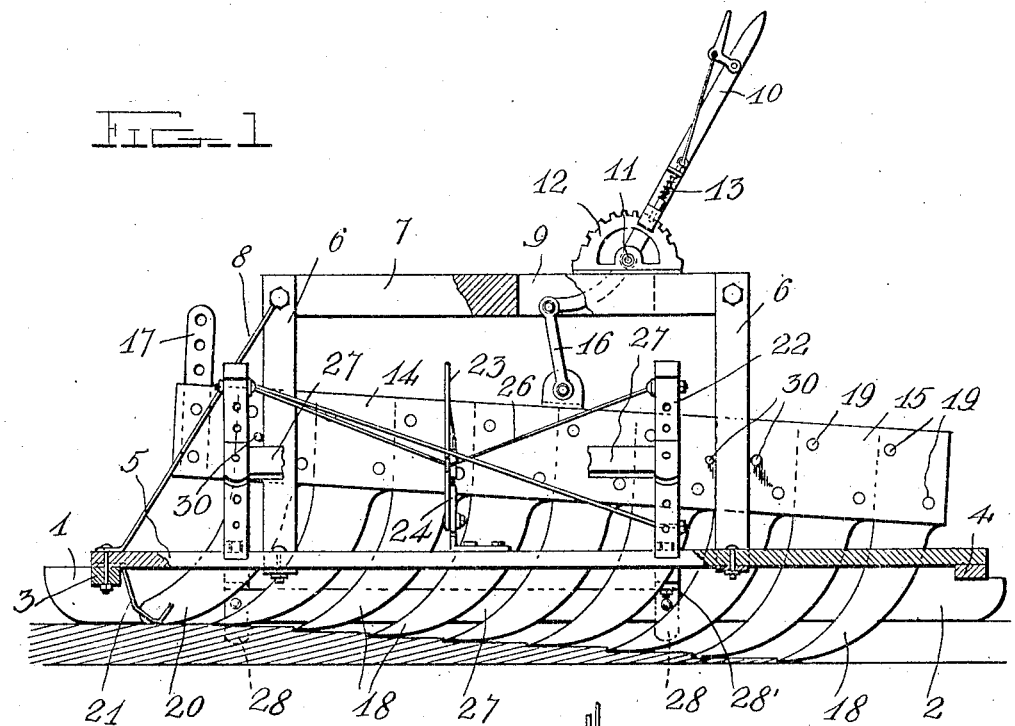
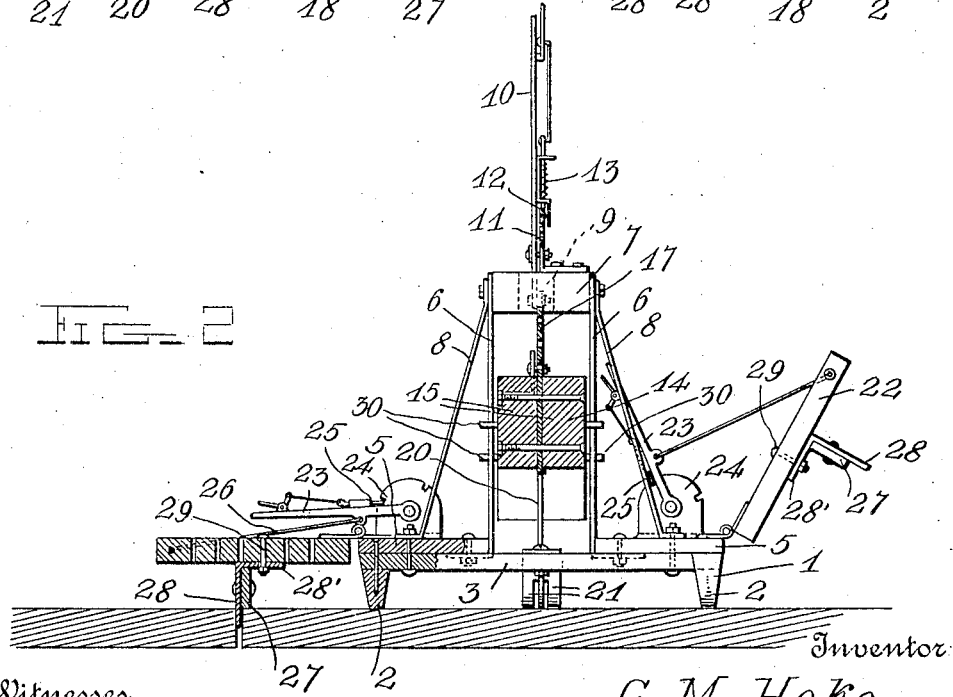
Witnesses
C. H. Griesbauer
Inventor
G. M. Hoke
by H. B. Willson & Co.
Attorneys

UNITED STATES PATENT OFFICE.

GEORGE M. HOKE, OF HARRISONVILLE, MISSOURI.

ICE-PLOW.

No. 849,544.  Specification of Letters Patent.  Patented April 9, 1907.

Application filed April 2, 1906. Serial No. 309,431.

*To all whom it may concern:*

Be it known that I, GEORGE M. HOKE, a citizen of the United States, residing at Harrisonville, in the county of Cass and State of Missouri, have invented certain new and useful Improvements in Ice-Plows; and I do declare the following to be a full, clear, and exact description of the invention, such as will enable others skilled in the art to which it appertains to make and use the same.

My invention is an improved ice-plow for cutting ice; and it consists in the construction, combination, and arrangement of devices hereinafter described and claimed.

The object of my invention is to provide an improved ice-plow which may be drawn over the ice on a lake or stream and which is effective to cut the ice in strips of any desired width to enable the ice to be readily harvested.

In the accompanying drawings, Figure 1 is partly a side elevation and partly a longitudinal sectional view of an ice-plow embodying my improvements, and Fig. 2 is partly a front elevation and partly a transverse sectional view of the same.

In the embodiment of my invention I provide a sled 1, which is here shown as composed of runners 2, front and rear cross-bars 3 4, and running-boards 5, which are secured on said runners and cross-bars and are spaced apart to form a longitudinal opening between them. Standards 6 are secured to the said running-boards and extend upwardly from the inner sides thereof. The said standards are secured to and serve to support a longitudinal bar 7. The front standards are strengthened by braces 8. The bar 7 is provided with a longitudinal opening 9, which extends vertically therethrough. A bell-crank lever 10 is fulcrumed in a bearing 11, which is secured on the said bar, the lower arm of the bell-crank lever being adapted to operate in the opening 9 in said bar. Also secured on the said bar is a segment-rack 12. The lever 10 is provided with a locking-dog 13, of usual construction, which coacts with the said segment-rack to lock the said lever in any desired position.

A beam 14, which comprises a pair of longitudinal members 15, is disposed between the pairs of standards 6 and may be raised and lowered by means of the lever 10, the latter being connected to the beam by a link 16. Pins 30 project from opposite sides of the beam 14, bear against the standards 6, and hence cause the sled to move with the plow comprising the beam and the cutters when draft stress is applied to said plow through said beam, and said pins coact with the said standards to guide the plow when it is being raised or lowered and also coact with the standards to relieve the lever 10 and link 16 of draft stress. At the front end of the said beam is a clevis 17, to which a horse or team may be hitched, or a rope or chain may be attached to said clevis to enable the plow to be drawn by a number of persons, or by means of a tackle, or by other suitable means. The beam 14 carries a suitable number of cutters 18, which are preferably of the form here shown, but which may be of any other suitable construction. The upper portions of the said cutters are secured between the members 15 of the beam by suitable bolts 19, which pass through said cutters and beam members. At the front end of the said beam is a standard 20, which bears on the surface of the ice in advance of the cutters, partly sustains the weight of the beam and the downthrust of the front end thereof incident to the application of the draft stress thereto, and hence said standard partially relieves the cutters of the weight and stress of the beam and prevents said cutters from cutting too deeply. Furthermore, said standard acts as a runner and causes the front end of the beam to rise and fall with any inequalities which may exist on the surface of the ice, and hence serves to moderate the action of the cutters when such inequalities are encountered.

A spring-shoe 21 is secured to the front cross-bar 3 and extends downwardly and rearwardly therefrom to run on the surface of the ice. Said spring-shoe has a longitudinal opening through which the standard 20 extends. The said spring-shoe partly sustains the weight and stress of the sled and by bearing on the surface of the ice at points immediately on opposite sides of the runner-standard 20 prevents the said standard from chipping the ice. To the sides of the sled 1 are hinged gage-frames 22. Levers 23 are mounted on segment-standards 24, which are secured on the running-boards of the sled and are provided with notches which may be engaged by dogs 25, with which said levers are provided, to lock at any desired position. The said levers are connected to the gage-frames 22 by means of rods 26, and hence said gage-frames may be raised and lowered at will. Each gage-frame is provided with a laterally-shiftable longitudinal bar 27, to the ends of which are secured gage-plates 28, having horizontal arms 28', which bear under the front and rear bars of the frames 22 and are secured thereto by means of bolts 29. Said bars of the gage-frames are provided with a plurality of bolt-openings for the reception of said bolts, so that the gage-plates, together with the longitudinal bars 27, may be set at any desired width from the line of cutters 18, according to the desired width of the strips of ice to be cut by the plow.

From the foregoing description, taken in connection with the accompanying drawings, the construction, operation, and advantages of the invention will be readily understood without requiring a more extended explanation.

Various changes in the form, proportion, and the minor details of construction may be resorted to without departing from the principle or sacrificing any of the advantages of the invention as defined by the appended claim.

Having thus described my invention, what I claim as new, and desire to secure by Letters Patent, is—

In an ice-plow, the combination of a sled having a shoe at its front end to bear on the ice and provided with an opening, a beam having cutters and a standard, the latter operating in the opening of the shoe, guides for the said beam, and means to raise and lower the beam, together with its cutters and standard, with reference to the sled, for the purpose set forth.

In testimony whereof I have hereunto set my hand in presence of two subscribing witnesses.

GEORGE M. HOKE.

Witnesses:
A. L. BURNEY,
V. J. WILLETT.